US010887329B2

(12) United States Patent
Radja et al.

(10) Patent No.: US 10,887,329 B2
(45) Date of Patent: Jan. 5, 2021

(54) CLUSTER-BASED PRECISION MITIGATION OF NETWORK ATTACKS

(71) Applicant: A10 NETWORKS, INC., San Jose, CA (US)

(72) Inventors: Vishnu Vasanth Radja, San Jose, CA (US); Vernon Richard Groves, San Jose, CA (US); Diptanshu Purwar, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 96 days.

(21) Appl. No.: 16/046,728

(22) Filed: Jul. 26, 2018

(65) Prior Publication Data

US 2020/0036734 A1    Jan. 30, 2020

(51) Int. Cl.
*H04L 29/00*  (2006.01)
*H04L 29/06*  (2006.01)
(Continued)

(52) U.S. Cl.
CPC ......... *H04L 63/1416* (2013.01); *G06N 5/02* (2013.01); *G06N 20/00* (2019.01);
(Continued)

(58) Field of Classification Search
CPC .. H04L 63/1425; H04L 63/1416; G06N 20/00
See application file for complete search history.

(56) References Cited

U.S. PATENT DOCUMENTS

| 7,792,770 B1 * | 9/2010 | Phoha | G06N 20/00 706/45 |
| 8,682,812 B1 * | 3/2014 | Ranjan | H04L 63/1425 706/12 |

(Continued)

OTHER PUBLICATIONS

Muniyandi, A.P., Rajeswari, R. and Rajaram, R., 2012. Network anomaly detection by cascading k-Means clustering and C4. 5 decision tree algorithm. Procedia Engineering, 30, pp. 174-182. (Year: 2012).*

(Continued)

*Primary Examiner* — James R Turchen
(74) *Attorney, Agent, or Firm* — Keith Kline; The Kline Law Firm PC (57) ABSTRACT

Provided are methods and systems for cluster-based mitigation of a network attack. A method for cluster-based mitigation of a network attack may commence with detecting an unusual pattern in network data traffic associated with data sources. The method may further include extracting signature parameters associated with the network data traffic. The signature parameters may be indicative of the network attack. The method may continue with assigning importance weights to the signature parameters based on historical signature data to generate weighted signature parameters. The method may further include building a decision tree for the data sources based on the weighted signature parameters. The method may continue with creating an optimal number of clusters for the data sources based on an analysis of the decision tree. The method may further include selectively taking at least one mitigating action with regard to the data sources within the clusters.

20 Claims, 6 Drawing Sheets

US 10,887,329 B2

Page 2

(51) Int. Cl.
*G06N 5/02* (2006.01)
*G06N 20/00* (2019.01)

(52) U.S. Cl.
CPC ...... *H04L 63/0227* (2013.01); *H04L 63/1425* (2013.01); *H04L 63/1458* (2013.01)

(56) References Cited

U.S. PATENT DOCUMENTS

| | | | |
|---|---|---|---|
| 2011/0040706 A1* | 2/2011 | Sen | G06N 20/00 706/12 |
| 2012/0054184 A1* | 3/2012 | Masud | G06F 16/285 707/737 |
| 2012/0240185 A1* | 9/2012 | Kapoor | H04L 41/0866 726/1 |
| 2016/0308734 A1* | 10/2016 | Feller | H04L 41/16 |
| 2016/0359872 A1* | 12/2016 | Yadav | H04L 63/02 |
| 2018/0069893 A1* | 3/2018 | Amit | H04L 63/1441 |
| 2018/0287907 A1* | 10/2018 | Kulshreshtha | H04L 43/026 |
| 2019/0166454 A1* | 5/2019 | de Lacheze-Murel | H04W 12/02 |

OTHER PUBLICATIONS

Garg, S. and Batra, S., 2017. Fuzzified cuckoo based clustering technique for network anomaly detection. Computers & Electrical Engineering, 71, pp. 798-817. (Year: 2017).*

Zhao, X. and Zhang, W., Jul. 2016. An anomaly intrusion detection method based on improved k-means of cloud computing. In 2016 Sixth International Conference on Instrumentation & Measurement, Computer, Communication and Control (IMCCC) (pp. 284-288). IEEE. (Year: 2016).*

* cited by examiner

CLUSTER-BASED PRECISION MITIGATION OF NETWORK ATTACKS

TECHNICAL FIELD

This disclosure relates generally to data processing and, more particularly, to mitigation of network attacks.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A conventional method for detection of a distributed denial of service (DDOS) attack involves monitoring a data flow to determine rates and trends of various indicators (e.g., packets per second, octets, flags, connections, connections per second, and so forth) at any moment of time during both peace time (when no attack is present) and attack time to collect data based on which a baseline of indicators is created. When the indicators exceed the peacetime baseline, an attack detector may begin to take actions to mitigate the attack.

The mitigation may start with the attack detector initiating a fact finding mode to determine whether a data source is spoofed. Such determination may be performed based on some attributes of the data associated with the data source. For example, the attack detector may determine whether the data conform to an existing protocol specification and rules of their usage, whether the data are destined for an existing service, whether the data are associated with a previously known source (good, bad, or other), whether the data sources that send the data are real or spoofed, whether the data source conforms to a learned or static rate, and the like. Determining whether the data have these attributes may help the attack detector to select a policy to be applied to the data flow.

Conventionally, the attack detector takes a decision to block data traffic from a data source related to the indicators exceeding the baseline. For example, the attack detector may determine that the data source is spoofed and do not pass the data packet sent by the data source, determine that data packets do not conform to specification and block the data source, determine that the data source is sending data packets too fast and reduce the rate of processing data packets of the data source, and so forth. However, simply exceeding the baseline may not always be result of an attack. For example, in some cases, valid data sources may send data packets to a target at a higher rate, but the attack detector may decide that the higher rate of sending the data packets is an indication of an attack. Consequently, the attack detector may erroneously block valid data sources. Thus, traditional approaches to mitigating network attacks may result in considerable collateral damage.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure relates to approaches for cluster-based mitigation of a network attack. Specifically, a system for cluster-based mitigation of a network attack may include at least one processor and a storage unit in communication with the at least one processor. The at least one processor may be configured to detect an unusual pattern in network data traffic associated with data sources. The at least one processor may be configured to extract signature parameters associated with the network data traffic. The signature parameters may be indicative of the network attack.

The at least one processor may be further configured to assign importance weights to the signature parameters based on historical signature data to generate weighted signature parameters. The security gateway may be further configured to build a decision tree for the data sources based on the weighted signature parameters and create an optimal number of clusters for the data sources based on an analysis of the decision tree. The security gateway may be further configured to selectively take at least one mitigating action with regard to the data sources within the clusters. The storage unit may be configured to store at least the historical signature data.

According to another approach of the present disclosure, there is provided a method for cluster-based mitigation of a network attack. The method may commence with detecting an unusual pattern in network data traffic associated with data sources. The method may further include extracting signature parameters associated with the network data traffic. The signature parameters may be indicative of the network attack. The method may continue with assigning importance weights to the signature parameters based on historical signature data to generate weighted signature parameters. The method may further include building a decision tree for the data sources based on the weighted signature parameters. The method may continue with creating an optimal number of clusters for the data sources based on an analysis of the decision tree. The method may further include selectively taking at least one mitigating action with regard to the data sources within the clusters.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, router, network appliance, and so forth.

As outlined in the summary, the embodiments of the present disclosure are directed to cluster-based mitigation of a network attack. A system for cluster-based mitigation of a network attack may be provided for learning parameters associated with a network data traffic and determining which traffic comes from undesired data sources and needs to be blocked. Additionally, the system is directed to avoiding blocking the traffic from legitimate data sources that send the traffic not according to their usual pattern, thereby reducing the amount of collateral damage that may be caused as when the traffic from both attackers and legitimate data sources is blocked.

The system may continuously monitor the network data traffic. Based on the monitoring, the system may determine that there are unusual patterns in the network data traffic. The patterns of the network data traffic may be associated with a set of parameters of the network data traffic. A determination of unusual patterns may be made based on comparison of current parameters associated with the network data traffic and baseline parameters. The baseline parameters may be obtained from historical data associated with peacetime conditions for by baselining the network data traffic during the peacetime conditions.

Upon detecting the unusual pattern in network data traffic, the system may extract signature parameters of the network data traffic that are indicative of the network attack. For example, the signature parameters may include one or more of a repeating source port, an Internet protocol (IP) packet length, a packet fragmentation, packet header properties, and so forth. After the signature parameters are extracted, the system may assign importance weights to the signature parameters based on historical signature data.

Thereafter, a machine learning model may be used by the system to group weighted signature parameters of the network data traffic from multiple data sources into clusters. The system may use the machine learning model to build a decision tree for the data sources based on the weighted signature parameters. Upon creation of the decision tree, the system may analyze the decision tree and create an optimal number of clusters. The analysis of the decision tree may be performed to find similarities and/or patterns in the weighted signature parameters. The optimal number of clusters may be determined using a K-means algorithm and silhouette analysis, where K is the number of clusters. Each cluster may indicate a spike of an attack found in the network data traffic based on the signature parameters.

After determining the optimal number of clusters, the system may selectively take mitigating actions with regard to the data sources within the clusters. Specifically, the system may filter the network data traffic and block the data sources within the clusters.

Figure 1:
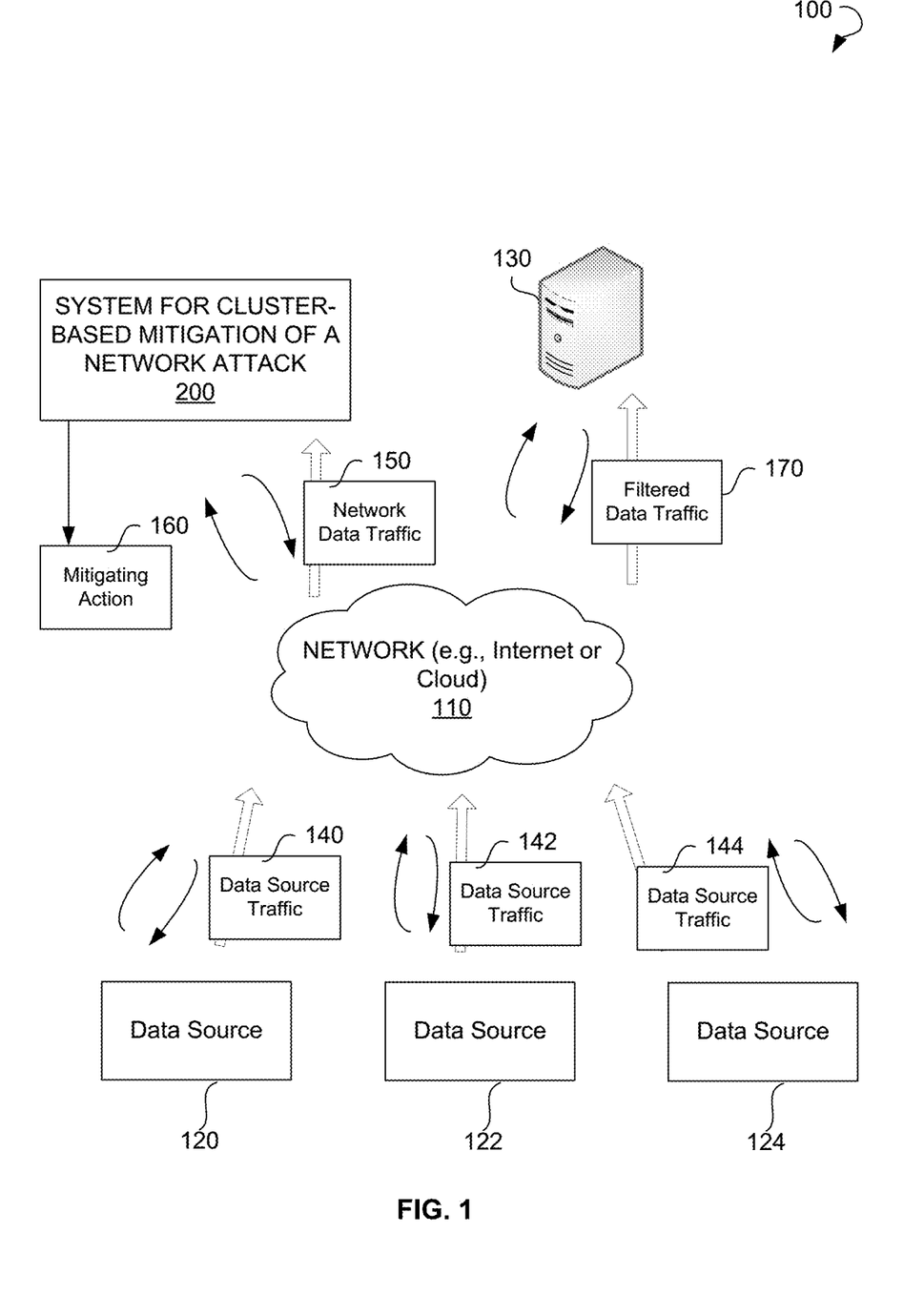
FIG. 1 shows an environment, within which methods and systems for cluster-based mitigation of a network attack can be implemented, according to an example embodiment.

Referring now to the drawings, FIG. 1 illustrates an environment 100 within which methods and systems for cluster-based mitigation of a network attack can be implemented. The environment 100 may include a data network shown as a network 110, such as the Internet or a computing cloud, a plurality of data sources 120, 122, and 124, a server 130, and a system 200 for cluster-based mitigation of a network attack. The data sources 120, 122, and 124 may include network machines or network resources. Each of the data sources 120, 122, and 124 may send data traffic shown as data source traffic 140, 142, and 144 to the server 130. The data sources 120, 122, and 124 and the server 130 may communicate with each other using the network 110.

The network 110 may include the Internet, the cloud, or any other network capable of communicating data between devices. Suitable networks may include or interface with any one or more of, for instance, a local intranet, a Personal Area Network, a Local Area Network, a Wide Area Network, a corporate data network, a data center network, a home data network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (FireWire) connection, a Fiber Channel connection, an IrDA (infrared) port, a Small Computer Systems Interface connection, a USB (Universal Serial Bus) connection or other wired or wireless, digital or analog interface or connection, mesh or Digi® networking. The network 110 may include a network of data processing nodes that are interconnected for the purpose of data communication.

The system 200 may intercept data traffic directed to the server 130. Specifically, the system 200 may intercept network data traffic 150 that may include data source traffic 140, 142, and 144 from all data sources 120, 122, and 124. The system 200 may analyze the network data traffic 150 and take a mitigating action 160 with regard to data traffic from data sources classified as undesired. Specifically, the system 200 may filter the network data traffic 150 by blocking the data traffic from undesired data sources and may forward filtered data traffic 170 to the server 130.

Figure 2:
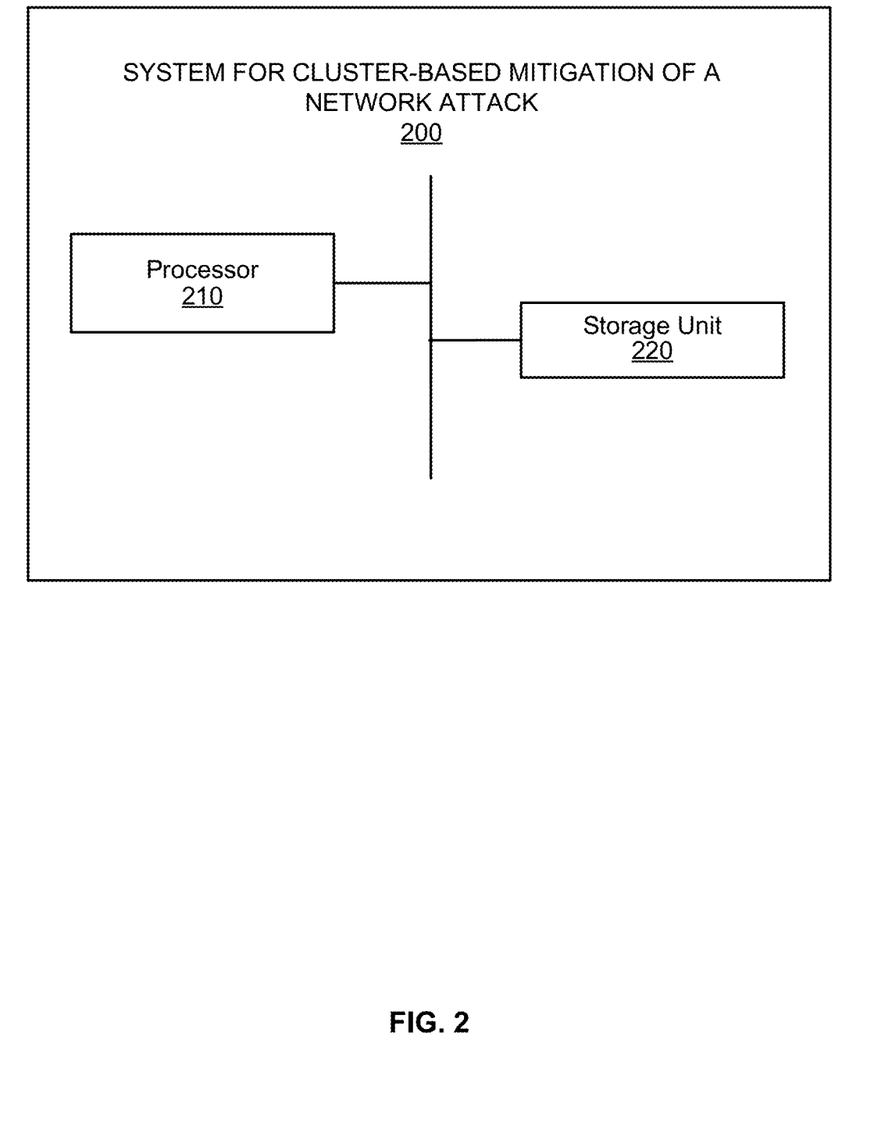
FIG. 2 is a block diagram illustrating various modules of a system for cluster-based mitigation of a network attack, according to an example embodiment.

FIG. 2 shows a block diagram illustrating various modules of an example system 200 for cluster-based mitigation of a network attack. Specifically, the system 200 may include at least one processor 210 and a storage unit 220. In an example embodiment, the system 200 may be implemented in a form of a security gateway, a network controller, a servicing node, an application delivery controller, or any other network device. In an example embodiment, the system 200 may be located on a network between a plurality of data sources and a server and may monitor data communications between the data sources and the server.

The processor 210 may be configured to detect an unusual pattern in network data traffic associated with data sources. The processor 210 may be further configured to extract signature parameters associated with the network data traffic. The signature parameters may be indicative of the network attack. The signature parameters may include at least one of the following: a repeating source port, an IP packet length, a packet fragmentation, and so forth. The signature parameters include further components associated with a plurality of data layers packets. In an example embodiment, the processor 210 may have an extraction engine configured to extract signature parameters.

In an example embodiment, the processor 210 may be further configured to accelerate the extraction of the signature parameters by discarding low volume signature parameters. The processor 210 may be configured to assign importance weights to the signature parameters. The importance weights may be assigned based on historical signature data to generate weighted signature parameters.

The processor 210 may be further configured to build a decision tree for the data sources based on the weighted signature parameters. In an example embodiment, the decision tree may be built using one or more machine learning techniques implemented in a machine learning model. The decision tree may be built to find similarities and patterns that emerge from the weighted signature parameters.

Upon building the decision tree, the processor 210 may create an optimal number of clusters for the data sources. The optimal number of clusters may be created based on an analysis of the decision tree. An example procedure for building a decision tree is described in detail below with reference to FIG. 3.

Figure 3:
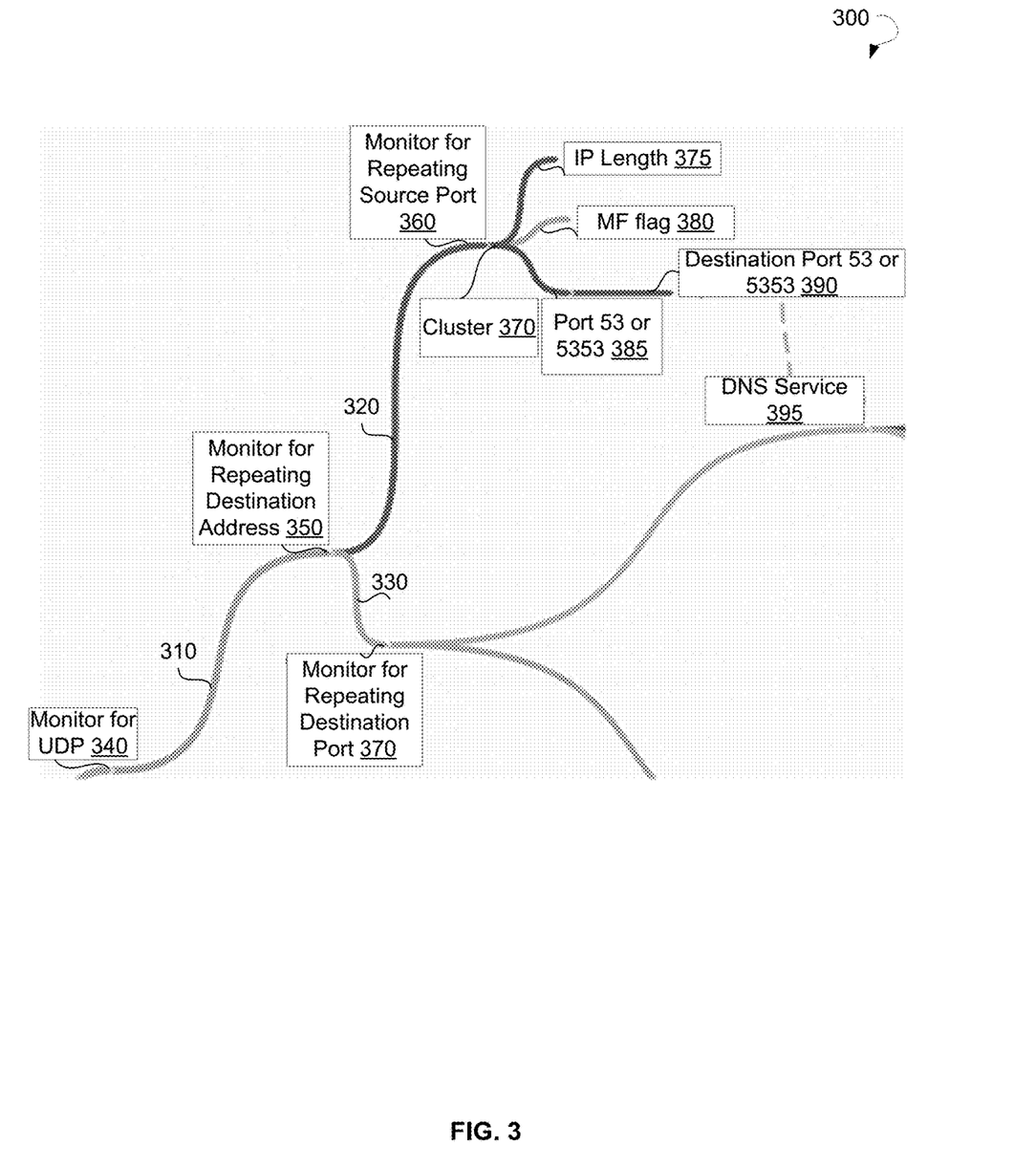
FIG. 3 is a schematic diagram illustrating a decision tree, according to an example embodiment.

FIG. 3 is a schematic diagram illustrating a decision tree 300 built based on signature parameters of network data traffic, according to an example embodiment. A decision tree 300 may be built based on historical data collected in the course of previous experiences with finding and mitigating network attacks. The decision tree 300 may have a plurality of branches 310, 320, 330. The branches 310, 320, 330 of the decision tree 300 may correspond to signature parameters of interest of the network data traffic. In an example embodiment, the signature parameters may include various elements of layer-3 packets, layer-4 packets, layer-7 packets, and so forth.

An importance weigh may be assigned to each branch. Thus, each signature parameters may have a predetermined importance weight. The importance weights may be predetermined based on historical data. The length of each branch may correspond to the importance weight of branch. The importance weights may be utilized as input for clustering the attack features, i.e. clustering the signature parameters that are indicative of the network attack.

Signature parameters may include a User Datagram Protocol (UDP), as shown in step 340. Monitoring UDP data is important in detection of an amplification attack, which is typically performed by sending packets sourced from the same UDP port (e.g., port 1211) over and over again. If such UDP behavior is detected, then the analysis may proceed to step 350, where the signature parameters may be monitored to detect repeating destination address, such as a repeating destination IP address. If the repeating destination addresses are detected, the signature parameters may be monitored to detect a repeating source port as shown by step 360 or a repeating destination port as shown by step 370. If the repeating source port is detected, then signature parameters may be clustered at step 370. The clusterization may be performed based on an IP length 375, a more fragments (MF) flag 380, a port 385, such as port 53 or 5353, and so forth. The cluster related to the destination port 53 or 5353 shown as a destination port 390 may be then determined. Upon determination of the destination port 390 present in the cluster, DNS service 395 may be performed in respect of the data network traffic. For example, port 53 or 5353 may be confirmed as being associated with an attack, a security gateway may be informed that the signature parameters related to destination port 53 or 5353 are associated with the attack, and the like.

Referring back to FIG. 2, in an example embodiment, the optimal number of clusters may be predetermined based on historical information associated with the decision tree. The optimal number of clusters may also be determined using a K-means algorithm, where K is the number of clusters. The processor 210 may be further configured to analyze the signature parameters of the clusters using at least one machine learning technique.

The K-means algorithm may include partitioning pieces of data (signature parameters) into K clusters. The problem of partitioning is a non-deterministic polynomial-time (NP) hard problem because it is computationally difficult to find an optimal number of K. Although it is important to find the number K of clusters at a faster rate, there are not many efficient solutions to find K in an optimal way. The system 200 of the present disclosure provides an improved version of a K finder using silhouette analysis of a dataset with varying values of K. The silhouette analysis is a method of interpretation and validation of consistency within the clusters of data. The silhouette analysis provides a succinct graphical representation of a measure of how similar an object (a piece of data) is to its own cluster compared to other clusters.

Normally, K values are incrementally increased from value 2 till the silhouette value reaches close to 1. The silhouette value varies from −1 to 1 depending on the value of K on a particular dataset. A high silhouette value shows that the object matches the cluster well and poorly matches neighboring clusters. The silhouette value closer to −1 means the clusters are not distinct. If the silhouette value is closer to 1 then it means that cluster points are denser and also that the clusters are away from each other. The selected number of clusters is appropriate if most objects have a high value. The clustering configuration is inappropriate (e.g., too many or too few clusters are created) if many objects have a low or negative silhouette value. Therefore, incrementally iterating the K value for the silhouette analysis may consume a large amount of time. The system 200 of the present disclosure provides arriving at the silhouette value at a faster rate and also provides the K value accurately.

The system 200 may operate as an optimal K finder as follows. The processor 210 may start with K value ranging from 2 to 4 and run the silhouette analysis. If the silhouette value for K is not close to +1, then the largest value in the range is doubled. In this case, 4 is doubled. Additionally, the lowest value in the range is assigned the previous largest value plus 1. In this case, the lowest value will be 4+1=5. Therefore, the range is from 5 to 8. The silhouette analysis may be re-run for the range 5 to 8.

The processor 210 may determine, for a range of 5 to 8, whether the silhouette value of either of these values is close to +1. If it is found that the values are close to +1, the middle of the range can be used to determine whether the silhouette value has reached the peak and dipped. For example, the silhouette value for 5 may be 0.9 and the silhouette value for 8 may be 0.95. The middle of 5 and 8 is 7. Therefore, the silhouette value of 7 may be 0.99. The processor 210 may determine that 8 is not the optimal value since there is a K=7 which has a better silhouette value.

Then, the processor 210 may analyze the range from 5 to 7 and re-run the silhouette analysis for this range. The middle of 5 and 7 is 6. The silhouette value may be calculated for 6 and may be 0.95. Therefore, it may be determined that K=5 is not the optimal K value since it was determined that K=6 is better. Value 5 may be eliminated. The processor 210 may continue with analyzing the range from 6 to 7.

The processor 210 may perform the silhouette analysis for the range from 6 to 7. There is no middle value between 6 and 7 and the processor 210 may choose K which has the highest silhouette value. The processor 210 may determine that K=7 has the better silhouette value and, in this case, the optimal K is 7.

Alternatively, the processor 210 may determine that the silhouette value for range from 5 to 8 is not close to +1. The processor 210 may double 8 to 16 and then to 32 and to 64 and so on, in the powers of 2, until the processor 210 may found K that has the silhouette value close to +1.

Since the processor 210 skips the unwanted K and doubles them, the processor 210 may save time by not calculating the silhouette values for most of unwanted ranges. This silhouette analysis approach is faster than the traditional silhouette method of finding K by the factor of power of 2.

Finally, the processor 210 may use the optimal K value to input this value into the K-means algorithm using the same dataset as used to find K. K may provide high precision in calculating the patterns in form of clusters for the chosen signature parameters of interest. Each cluster may have a set of signature parameters and such cluster parameters as a centroid, min, max, and blast radius. The centroid values, min and max range and the radius of each cluster may be determined. In an example embodiment, these parameters may be determined using machine learning techniques. The data extracted from each cluster may be applied in a filter, such as a Berkeley Packet Filter (BPF), to block an unwanted traffic.

The processor 210 may be further configured to implement fast filtering based on historical data until the analysis of the clusters is complete. The speed of execution and accuracy of the analysis may be provided using the following operating conditions and outputs.

Port percentage. The port percentage may be used for fast response based on source port percentage or destination port percentage in the network data traffic. The port percentage is a parameter used to determine which port to consider based on the percentage of repetition of ports in a given sample of the network data traffic. If a particular source port is repeated 80% of the times in a given Packet Capture (Pcap), only this source port may be selected and the rest of the ports may be ignored, since it is known which port provides the highest volume of data. This feature may help make the signature extraction faster and more relevant, instead of unnecessary exploring all the other ports and branches.

Timed output. The timed output is a feature used to extract faster filters to block the DDOS attack. Even though the time taken for the extraction engine to complete may be longer, the system 200 may not have a large amount of time to block the attack. Therefore, timed filter output may be provided that may give incomplete results with high collateral damage, in particular, when the traffic from legitimate data sources may be blocked. However, when the extraction engine has more time, the extraction engine may provide a better filter and get more accurate results. Until the extraction is complete, the system 200 may be able to obtain timed results that may keep improving overtime.

Static cluster count. In the static cluster count, the K-value may be hardcoded if it is known how many clusters are present in the given branch. The static cluster count may be associated with a configuration option which may take the K static cluster value from a user and not execute the optimal k-finder. This operation may save time and provide filters faster. However, the accuracy of the K static cluster value cannot be guaranteed because the K value was provided by the user. This method is the fastest and is a powerful tool to test the network data traffic manually based on historic data.

In some example embodiments, the output may be in the JavaScript Object Notation (JSON) format. JSON can be easily imported and read by all modules of the system 200. JSON may be output from an internal dictionary which may store all the relevant data for forming the filter. The internal dictionary may be stored in the storage unit 220.

The JSON output format may have metadata that shows the percentage, total count, number of services, and other relevant information. Each service may have its cluster count and its cluster statistics. Each cluster may have its signature parameters and its cluster parameters, such as a centroid, min, max and blast radius. The statistics data for each cluster may be used to form the BPF to block the traffic for specific combinations of signature parameters.

The processor 210 may be further configured to selectively take at least one mitigating action with regard to the data sources within the clusters. In an example embodiment, the at least one mitigating action may be taken with regard to the data sources inside the radiuses determined by the processor 210. The at least one mitigating action may include filtering the network data traffic to block traffic coming from the data sources classified as undesired.

The storage unit 220 may be in communication with the processor 210. The storage unit may be configured to store data needed by the processor 210 for analyzing the network data traffic, building the decision tree, and creating clusters, such as historical signature data, the historical information associated with the decision tree, a policy for selecting the mitigating actions, and so forth.

Figure 4:
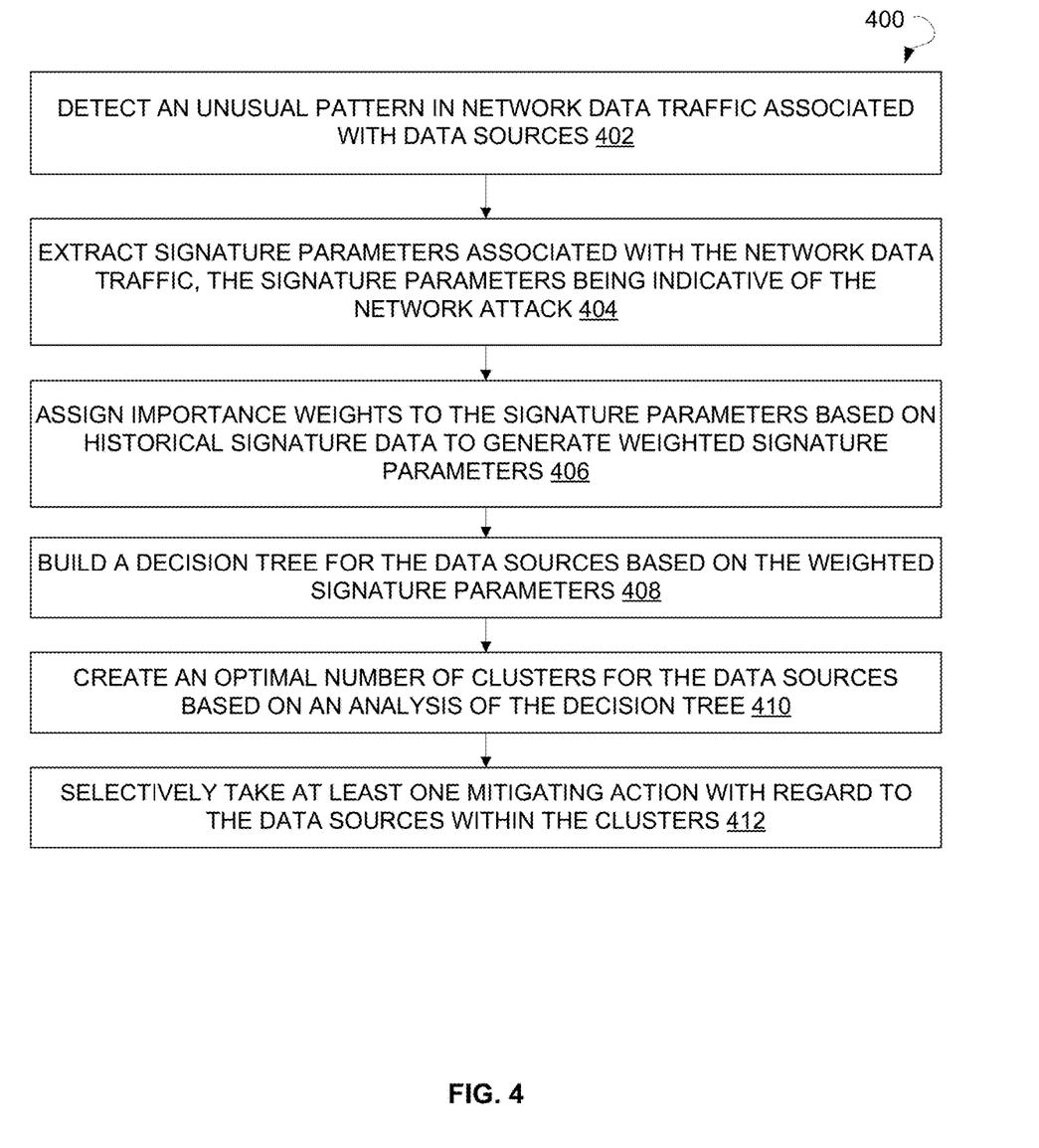
FIG. 4 is a process flow diagram of a method for cluster-based mitigation of a network attack, according to an example embodiment.

FIG. 4 shows a process flow diagram of a method 400 for cluster-based mitigation of a network attack, according to an example embodiment. In some embodiments, the operations of the method 400 may be combined, performed in parallel, or performed in a different order. The method 400 may also include additional or fewer operations than those illustrated. The method 400 may be performed by processing logic that may comprise hardware (e.g., decision making logic, dedicated logic, programmable logic, and microcode), software (such as software run on a general-purpose computer system or a dedicated machine), or a combination of both.

The method 400 may commence with detecting an unusual pattern in network data traffic associated with data sources at operation 402. The method 400 may continue with extracting signature parameters associated with the network data traffic at operation 404. The signature parameters may be indicative of the network attack. In an example embodiment, the signature parameters may include at least one of the following: a repeating source port, an IP packet length, a packet fragmentation, and so forth.

The method 400 may optionally include accelerating the extraction of the signature parameters by discarding low volume signature parameters. The method 400 may further include operation 406, where importance weights may be assigned to the signature parameters based on historical signature data. Based on the assignment of the importance weights, weighted signature parameters may be generated.

The method 400 may continue with building a decision tree for the data sources based on the weighted signature parameters at operation 408. At operation 410, an optimal number of clusters for the data sources may be created based on an analysis of the decision tree. In an example embodiment, the optimal number of clusters may be predetermined based on historical information associated with the decision tree. The optimal number of clusters may be determined using a K-means algorithm using silhouette analysis with varying values of K. The signature parameters of the clusters may be analyzed using at least one machine learning technique.

The method 400 may optionally include determining radiuses for each cluster. The radiuses may be determined using at least one machine learning technique. In an example embodiment, the method 400 may optionally include implementing fast filtering based on historical data until an analysis of the clusters is complete.

The method 400 may further include selectively taking at least one mitigating action with regard to the data sources within the clusters at operation 412. In an example embodiment, the at least one mitigating action may be taken with regard to the data sources inside the radiuses. The at least one mitigating action may include filtering the network data traffic to block traffic coming from the data sources classified as undesired.

Figure 5:
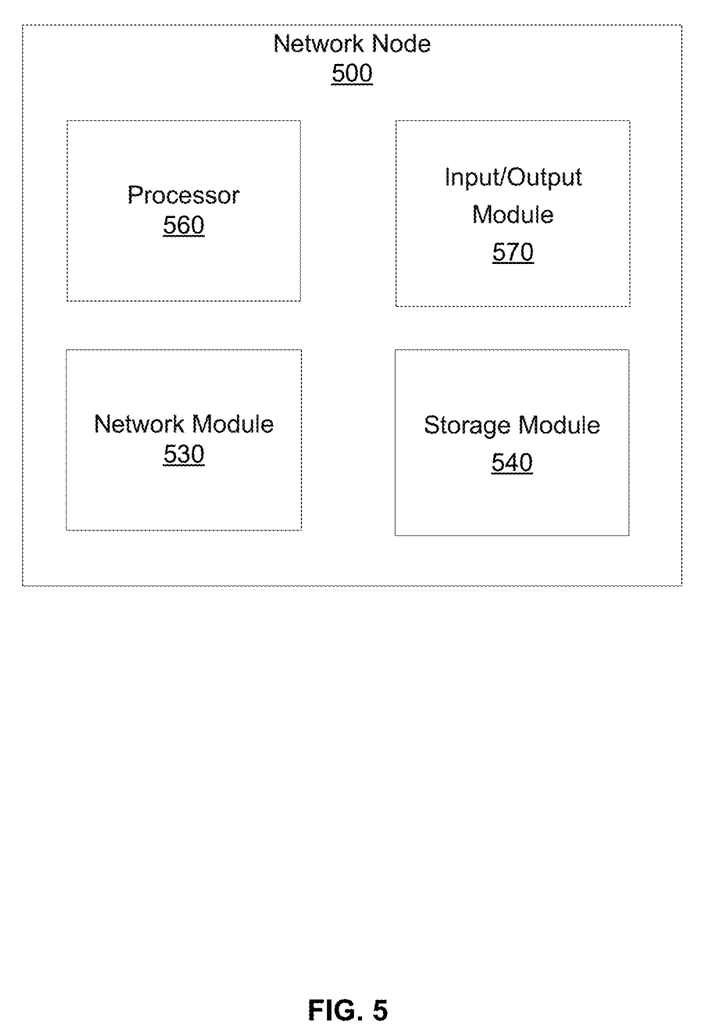
FIG. 5 is a block diagram illustrating a network node, according to an example embodiment.

FIG. 5 illustrates a network node 500 which can be a security gateway, a data source, or a server. In an example embodiment, the network node 500 may include a processor 560, a network module 530, a storage module 540, and an input/output (I/O) module 570. The processor 560 may include one or more processors which may be a microprocessor, an Intel processor, an AMD processor, a Microprocessor without Interlocked Pipeline Stages processor, a restricted instruction set computer (RISC) processor, or an Advanced RISC Machine (ARM)-based processor. In a further example embodiment, the processor 560 may include one or more processor cores embedded in a processor. In an example embodiment, the processor 560 may include one or more embedded processors, or embedded processing elements in a Field Programmable Gate Array, an ASIC, or Digital Signal Processor.

In an example embodiment, the network module 530 may include a network interface such as Ethernet, optical network interface, a wireless network interface, T1/T3 interface, a Wide Area Network or Local Area Network interface. In an example embodiment, the network module 530 may include a network processor.

In an example embodiment, the storage module 540 may include random access memory (RAM), dynamic random access memory, static random access memory, Synchronous Dynamic Random Access Memory, or memory utilized by the processor module 560 or the network module 530.

In an example embodiment, the storage module 540 may store data utilized by the processor 560. The storage module 540 may include a hard disk drive, a solid state drive, an external disk, or a readable external disk. The storage module 540 may store one or more computer programming instructions which, when executed by the processor 560 or the network module 530, implement one or more of the functionality of this present invention. In an example embodiment, the storage module 540 may serve as a storage unit 220 shown on FIG. 2.

The I/O module 570 may include a keyboard, a keypad, a mouse, a gesture based input sensor, a microphone, a physical or sensory input peripheral, a display, a speaker, or a physical or sensual output peripheral.

Returning to FIG. 2, in an example embodiment, the system 200 may be implemented using one or more network nodes as illustrated in FIG. 5.

Figure 6:
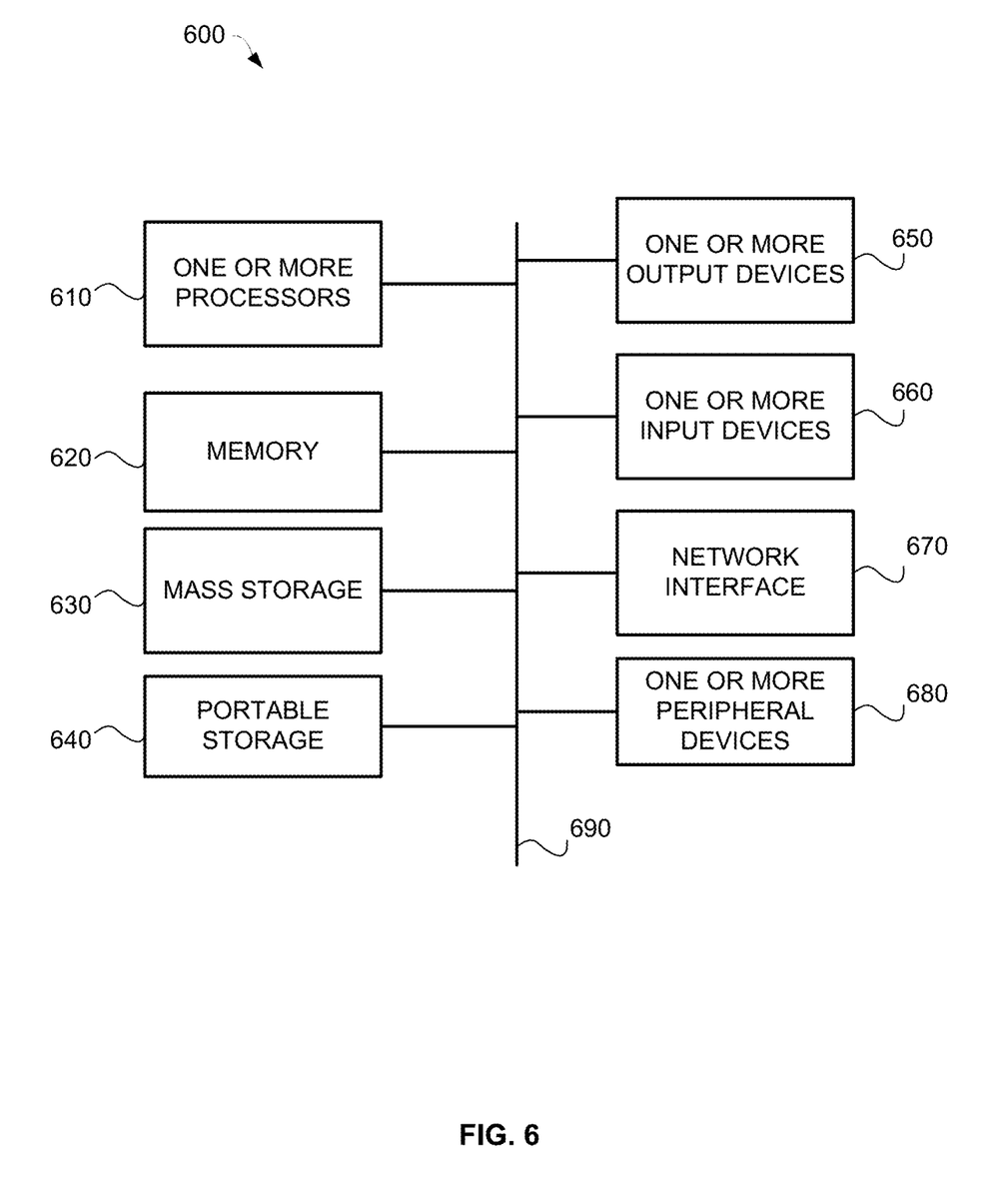
FIG. 6 shows a diagrammatic representation of a computing device for a machine, within which a set of instructions for causing the machine to perform any one or more of the methodologies discussed herein can be executed.

FIG. 6 illustrates an example computer system 600 that may be used to implement embodiments of the present disclosure. The computer system 600 may serve as a computing device for a machine, within which a set of instructions for causing the machine to perform any one or more of the methodologies discussed herein can be executed. The computer system 600 can be implemented in the contexts of the likes of computing systems, networks, servers, or combinations thereof. The computer system 600 includes one or more processor units 610 and main memory 620. Main memory 620 stores, in part, instructions and data for execution by processor 610. Main memory 620 stores the executable code when in operation. The computer system 600 further includes a mass data storage 630, portable storage medium drive(s) 640, output devices 650, user input devices 660, a graphics display system 670, and peripheral devices 680. The methods may be implemented in software that is cloud-based.

The components shown in FIG. 6 are depicted as being connected via a single bus 690. The components may be connected through one or more data transport means. Processor unit 610 and main memory 620 are connected via a local microprocessor bus, and mass data storage 630, peripheral device(s) 680, portable storage device 640, and graphics display system 670 are connected via one or more I/O buses.

Mass data storage 630, which can be implemented with a magnetic disk drive, solid state drive, or an optical disk drive, is a non-volatile storage device for storing data and instructions for use by processor unit 610. Mass data storage 630 stores the system software for implementing embodiments of the present disclosure for purposes of loading that software into main memory 620.

Portable storage device 640 operates in conjunction with a portable non-volatile storage medium, such as a floppy disk, Compact Disc, Digital Versatile Disc (DVD), or USB storage device, to input and output data and code to and from the computer system 600. The system software for implementing embodiments of the present disclosure is stored on such a portable medium and input to the computer system 600 via the portable storage device 640.

User input devices 660 provide a portion of a user interface. User input devices 660 include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 includes output devices 650. Suitable output devices include speakers, printers, network interfaces, and monitors.

Graphics display system 670 includes a liquid crystal display or other suitable display device. Graphics display system 670 receives textual and graphical information and processes the information for output to the display device.

Peripheral devices 680 may include any type of computer support device to add additional functionality to the computer system.

The components provided in the computer system 600 of FIG. 6 are those typically found in computer systems that may be suitable for use with embodiments of the present disclosure and are intended to represent a broad category of such computer components that are well known in the art. Thus, the computer system 600 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 600 may be implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for cluster-based mitigation of a network attack have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for cluster-based mitigation of a network attack, the system comprising:
   at least one processor configured to:
      detect an unusual pattern in network data traffic associated with data sources;
      extract signature parameters associated with the network data traffic, the signature parameters being indicative of the network attack;
      assign importance weights to the signature parameters based on historical signature data to generate weighted signature parameters, each of the weighted signature parameters being associated with one of the data sources;
      build a decision tree for the data sources based on the weighted signature parameters;
      group the weighted signature parameters into an optimal number of clusters based on an analysis of the decision tree; and
      for each of the clusters, selectively take at least one attack mitigating action with regard to one or more of the data sources associated with the weighted signature parameters grouped within each of the clusters; and
   a storage unit in communication with the at least one processor, the storage unit being configured to store at least the historical signature data.

2. The system of claim 1, wherein the optimal number of clusters is predetermined based on historical information associated with the decision tree.

3. The system of claim 1, wherein the optimal number of clusters is determined using a K-Means algorithm using silhouette analysis with varying values of K.

4. The system of claim 1, wherein the at least one processor is further configured to determine radiuses for each cluster, the at least one mitigating action being taken with regard to the data sources inside the radiuses.

5. The system of claim 4, wherein the radiuses are determined using at least one machine learning technique.

6. The system of claim 1, wherein the at least one processor is further configured to accelerate the extracting of the signature parameters by discarding low volume signature parameters.

7. The system of claim 1, wherein the at least one processor is further configured to implement filtering based on historical data until an analysis of the clusters is complete.

8. The system of claim 1, wherein the signature parameters include components associated with a plurality of data layers packets.

9. The system of claim 1, wherein the at least one mitigating action includes filtering the network data traffic to block traffic coming from the data sources classified as undesired.

10. The system of claim 1, wherein the signature parameters include at least one of the following: a repeating source port, an IP packet length, and a packet fragmentation.

11. The system of claim 1, wherein the signature parameters of the clusters are analyzed using at least one machine learning technique.

12. A method for cluster-based mitigation of a network attack, the method comprising:
    detecting an unusual pattern in network data traffic associated with data sources;
    extracting signature parameters associated with the network data traffic, the signature parameters being indicative of the network attack;
    assigning importance weights to the signature parameters based on historical signature data to generate weighted signature parameters, each of the weighted signature parameters being associated with one of the data sources;
    building a decision tree for the data sources based on the weighted signature parameters;
    grouping the weighted signature parameters into an optimal number of clusters based on an analysis of the decision tree; and
    for each of the clusters, selectively taking at least one attack mitigating action with regard to one or more of the data sources associated with the weighted signature parameters grouped within each of the clusters.

13. The method of claim 12, wherein the optimal number of clusters is predetermined based on historical information associated with the decision tree.

14. The method of claim 12, wherein the optimal number of clusters is determined using a K-Means algorithm using silhouette analysis with varying values of K.

15. The method of claim 12, further comprising determining radiuses for each cluster, the at least one mitigating action being taken with regard to the data sources inside the radiuses.

16. The method of claim 15, wherein the radiuses are determined using at least one machine learning technique.

17. The method of claim 12, further comprising accelerating the extracting of the signature parameters by discarding low volume signature parameters.

18. The method of claim 12, further comprising implementing filtering based on historical data until an analysis of the clusters is complete.

19. The method of claim 12, wherein the at least one mitigating action includes filtering the network data traffic to block traffic coming from the data sources classified as undesired.

20. A system for cluster-based mitigation of a network attack, the system comprising:
    at least one processor configured to:
        detect an unusual pattern in network data traffic associated with data sources;
        extract signature parameters associated with the network data traffic, the signature parameters being indicative of the network attack;
        assign importance weights to the signature parameters based on historical signature data to generate weighted signature parameters, each of the weighted signature parameters being associated with one of the data sources;
        build a decision tree for the data sources based on the weighted signature parameters;
        group the weighted signature parameters into an optimal number of clusters based on an analysis of the decision tree, wherein the optimal number of clusters is predetermined based on historical information associated with the decision tree;
        determine radiuses for each cluster, the at least one mitigating action being taken with regard to the data sources inside the radiuses, wherein the radiuses are determined using at least one machine learning technique; and
        for each of the clusters, selectively take at least one attack mitigating action with regard to one or more of the data sources associated with the weighted signature parameters grouped within each of the clusters; and
    a storage unit in communication with the at least one processor, the storage unit being configured to store at least the historical signature data and the historical information associated with the decision tree.

* * * * *